3,036,134
METHOD FOR CONVERTING ALCOHOLS
TO ETHERS
William Judson Mattox, Baton Rouge, La., assignor to Esso Research and Engineering Company, a corporation of Delaware
No Drawing. Filed Aug. 4, 1959, Ser. No. 831,470
7 Claims. (Cl. 260—614)

The present invention relates to the conversion of alcohols to ethers in the presence of crystalline alumino silicates. More particularly it concerns the dehydration of aliphatic alcohols to acyclic ethers by contacting said alcohols with porous crystalline alumino silicates at elevated temperatures.

Considerable work has been done on the dehydration of alcohol in the gaseous phase with solid catalysts including alumina; however, the conversion of alcohol to ether and the selectivity of the catalysts in the prior art have been relatively low. Even the best alumina catalyst converts less than 60% of ethyl alcohol to diethyl ether. Non-crystalline sodium alumino silicate converts even a smaller percentage of the aforementioned alcohol to the respective ether.

It has now been found that porous dehydrated crystalline alumino silicates are excellent catalysts for the dehydration of primary aliphatic alcohols. These crystalline catalysts are especially effective at moderately high temperatures and approximately atmospheric pressure.

The catalysts employed in the present invention have special application to the low molecular weight primary alkanols, such as methanol, ethanol and propanol. Both normal and isomeric $C_1$ to $C_6$ and higher monohydric alcohols are converted to their respective ethers with a high degree of selectivity in accordance with the following reaction:

$$2ROH \rightarrow ROR + H_2O$$

The alcohol feed should be in the form of a vapor when it contacts the crystalline alumino silicate catalyst in the reaction zone which is at temperatures of about 350 to 800° F., and preferably under substantially atmospheric pressure, although subatmospheric pressures or higher pressures, e.g. up to about 500 p.s.i.g. may also be used. The catalyst should be discrete particles which have a considerable surface area in order to permit adequate contact between the catalyst and the feed. The catalyst bed may be either fixed or fluid, the latter being preferred when a high degree of temperature control is desirable. In a fixed bed operation the average particle size of the catalyst may be as great as ½″ or more, but is generally between about ⅟₁₆ and ¼″ in diameter. If a fluid bed is employed, the catalyst must be in a finely divided form which can be fluidized by the lifting action of the alcohol, product ether and water vapors. Diluents, such as nitrogen, methane and ethane may be used in ratios of 0.1 to 1 vol./vol. of reactant vapor but usually they are not required. A portion of the solid particles, which have average sizes in the range of 20–100 microns, is continuously removed from the reaction zone and passed to a regeneration zone where, in the presence of an oxygen-containing gas, such as air, a small percentage of carbonaceous deposit is removed from the catalyst before it is recycled to the reaction zone. The catalyst particles in the fluid bed serve not only to promote the reaction but also they assist in the removal of any excess heat from the reaction zone. Moreover, the large surface area of the finely divided particles in the fluid bed, e.g. 100 to 500 sq. meters per gram, permits excellent contact with the reactant. Other methods for contacting solid catalysts with vaporized reactants, such as in a transfer line, may be employed.

Regardless of the state of the crystalline alumino silicate in the reaction zone, the monohydric alcohol feed should be introduced into the aforementioned zone at the rate of about 0.01 to 2 volume per volume of catalyst per hour (v./v./hr.). The feed, which is preferably preheated to the selected reaction temperature, is generally introduced at or near the bottom of the reactor and permitted to flow upwardly through the discrete catalyst particles and the reaction products are withdrawn near the top of the reactor, cooled and the ether product recovered as a liquid.

The reaction temperature should be regulated with a reasonable amount of care to prevent decomposition of the ether product to lower molecular weight substances, such as hydrogen, carbon monoxide, methane, ethylene, etc. In order to avoid any substantial degradation of the product, it is advisable to carry out the process at temperatures between about 400 and 600° F. It has been noted that at temperatures higher than the latter temperature, the amount of decomposition is markedly increased. While temperatures lower than 400° F. do not promote decomposition, they do not favor high conversion rates and therefore necessitate recycling large quantities of alcohol to the reaction zone. The pressure is not critical; however, mainly for economic reasons, it is desirable to operate at approximately atmospheric pressure.

The ether in the product stream leaving the reaction zone is usually separated from the normally liquid components in that stream by distillation. However, the vapor product stream may be cooled to approximately room temperature and a saturated solution of sodium chloride added to the liquids in order to divide the liquids into two distinct layers. The ether in the upper layer may be drawn off and further purified by fractional distillation. Other ether recovery processes may also be employed.

The present process permits conversion of at least about 70% and, in some instances, up to 100%. Moreover, the selectivity to the desired ether is quite high, usually being not less than about 90%.

The crystalline alumino silicates which are most useful in carrying out the present invention have average pore sizes of 5–15Å. They may be prepared by mixing and heating sodium aluminate and sodium silicate, preferably meta-silicate, under carefully controlled conditions to produce a crystalline product which is subsequently dehydrated under conditions to preserve the crystalline structure. The sodium content of the crystalline alumino silicate may, if desired, be replaced by effecting ion exchange with an appropriate metal salt, such as calcium, zinc, silver, lithium, potassium, etc. The metal ion, which has a valence of 1 to 3, influences the size of the pore openings, as does the ratio of the reagents and the reaction conditions. The preferred metal ions are sodium and calcium although, as indicated above, other Group I and II metals in the Periodic Chart of Elements, shown on pages 56 and 57 of Lange's Handboock of Chemistry, 8th edition, may be used.

The basic formula for all crystalline alumino silicates may be represented as follows:

$$M_{\frac{2}{n}}O : Al_2O_3 : XSiO_2 : YH_2O$$

wherein "M" represents a metal and "n" its valence. The value "X" will vary, e.g. 1.35 to 3, since the aluminum atoms and the silicon atoms occupy essentially equivalent positions in the lattice. Minor variations in the relative numbers of these atoms does not significantly alter the crystal structure or physical property of the catalyst. The average value for "Y" is between 4 and 8.

The formula for a 5Å aluminum silicate catalyst may be written as follows:

$$1.0(\pm 0.2)M_{\frac{2}{n}}O : Al_2O_3 : 1.85(\pm 0.5)SiO_2 : YH_2O$$

In this formula "M" represents a metal, "n" its valence and "Y" may be any value up to 6 depending on the identity of the metal and the degree of hydration of the crystals.

The formula for 13Å aluminum silicate catalyst may be written as follows:

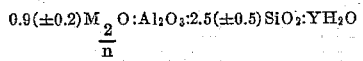

In this formula "M" represents a metal, "n" its valence and "Y" may be any value up to 8 depending on the identity of the metal and the degree of hydration of the crystal.

Methods of preparing the synthetic crystalline metal alumino silicate catalysts of the present invention are described in U.S. Patents 2,882,243 and 2,882,244 issued in the name of Robert M. Milton. The above-mentioned 5Å and 13Å aluminum silicates correspond to zeolite A and zeolite X, respectively, in the aforementioned patents.

The acyclic saturated ethers, e.g. dimethyl ether, diethyl ether, di-n-propyl ether, etc., prepared by the method described herein are useful as solvents and diluents for many materials, e.g. fats, oils, resins, waxes, gums, alkaloids, plastics, etc. The ethers also promote certain chemical reactions, especially sodium polymerizations. They are also useful in the manufacture of smokeless powder, medicines, organic syntheses, etc., and as extractants in various processes.

The following examples are submitted to illustrate the invention and show its advantages.

EXAMPLE 1

Pure methyl alcohol was vaporized by heating it to 500° F. at atmospheric pressure and passing it at the rate of 0.05 v./v./hr. over a fixed bed of a 13Å sodium alumino silicate catalyst (0.95Na$_2$O:Al$_2$O$_3$:2.5SiO$_2$) having an average particle size of 1/16 x 1/8 inch. The dehydrated alcohol product recovered from the fixed bed reactor, after passage through a cooling zone maintained at 32° F. to condense water vapor, consisted of 98+% dimethyl ether. The results of the run are set forth in Table I:

Table I

DEHYDRATION OF METHANOL WITH 13Å CRYSTALLINE SODIUM ALUMINO SILICATE AT ATMOSPHERIC PRESSURE AND 500° F.

| | |
|---|---|
| Conversion, percent | 100 |
| Product Analysis, Mol Percent: | |
| Dimethyl ether | 98.4 |
| Methanol | 0.0 |
| H$_2$ | 0.0 |
| CO | 0.0 |
| CO$_2$ | 0.0 |
| CH$_4$ | 0.0 |
| C$_2$H$_4$ | 0.2 |
| C$_2$H$_6$ | 0.0 |
| C$_3$H$_6$ | 0.3 |
| C$_4$H$_8$ | 0.8 |
| C$_5$H$_{10}$ | 0.3 |
| C$_6$H$_{12}$ | 0.0 |
| C$_7$H$_{14}$ | 0.0 |

The above data show that the conversion of alcohol was 100% and that the selectivity to dimethyl ether was extremely high. Thus, by employing the catalysts of this invention, it is possible to obtain an almost quantitative conversion of methanol to dimethyl ether.

EXAMPLE 2

The process described in Example 1 was repeated with the exception that the temperature in the reactor was 700° F. instead of 500° F. Again, a high conversion of alcohol was obtained (99%) but the selectivity was appreciably lower (37.9 mol percent vs. 98.4 mol percent dimethyl ether). A considerable quantity of methane, hydrogen, and carbon monoxide were formed in this run. Thus, in order to obtain a large conversion of the methanol to dimethyl ether while simultaneously avoiding decomposition, it is necessary to employ temperatures below 700° F., e.g. 400 to 600° F.

When Example 1 was repeated using a non-crystalline sodium alumino silicate and a feed rate of 0.06 vol. of alcohol/vol. of catalyst/hr. the conversion was less than 7%. This run demonstrates the unexpected benefits derived by employing crystalline rather than non-crystalline sodium alumino silicate catalysts.

The foregoing data show the superior performance of the crystalline sodium alumino silicate catalyst in the dehydration of alcohols, especially C$_1$ to C$_3$ alcohols, to ethers. It is not intended to restrict the present invention to these embodiments, but rather it should only be limited by the appended claims in which it is intended to claim all the novelty inherent in the invention.

What is claimed is:

1. A method for converting saturated monohydric lower aliphatic alcohols to their respective ethers which comprises contacting said alcohol in a vaporized state with discrete particles of a porous crystalline, metal alumino silicate catalyst having an average pore size of 5 to 15Å at a temperature of 400–600° F. under approximately atmospheric pressure, said catalyst having the following formula:

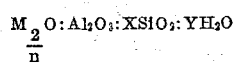

in which "M" represents a metal selected from the metals in groups I and II of the periodic table, "n" is the valence of the metal, "X" is 1.35 to 3.0 and "Y" is 4 to 8 and recovering an acyclic ether.

2. A method according to claim 1 in which the metal alumino silicate has an average pore size of 5Å.

3. A method according to claim 1 in which the metal alumino silicate has an average pore size of 13Å.

4. A method according to claim 1 in which the metal alumino silicate is sodium alumino silicate.

5. A method according to claim 1 in which the alcohol is methyl alcohol and the ether is dimethyl ether.

6. A method according to claim 1 in which the alcohol is ethyl alcohol and the ether is diethyl ether.

7. A method for converting a C$_1$ to C$_6$ saturated monohydric primary alcohol to an acyclic saturated ether which comprises contacting said alcohol in a vaporized state with porous crystalline sodium alumino silicate at 400–600° F. under approximately atmospheric pressure at the rate of 0.01 to 2 v./v./hr. and recovering substantially pure ether.

References Cited in the file of this patent

UNITED STATES PATENTS 2,837,572    Rottig _____ June 3, 1958

FOREIGN PATENTS 60,916    Sweden _____ June 11, 1924